United States Patent
Beauregard et al.

(10) Patent No.: US 12,468,410 B2
(45) Date of Patent: Nov. 11, 2025

(54) HUMAN-MACHINE INTERFACE DEVICE AND VEHICLE COMPRISING SUCH A HUMAN-MACHINE INTERFACE DEVICE

(71) Applicant: FAURECIA INTERIEUR INDUSTRIE, Nanterre (FR)

(72) Inventors: Julien Beauregard, Le Mesnil en Thelle (FR); Ahamed El Sayed, Chanteloup les Vignes (FR); Romain Feilleux, Epinay sur Seine (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 18/621,725

(22) Filed: Mar. 29, 2024

(65) Prior Publication Data

US 2024/0329762 A1 Oct. 3, 2024

(30) Foreign Application Priority Data

Mar. 30, 2023 (FR) ...................................... 2303085

(51) Int. Cl.
  *G06F 3/0362* (2013.01)
  *B60K 35/00* (2024.01)
  *B60W 50/08* (2020.01)
  *G06F 3/039* (2013.01)
  *G06F 3/041* (2006.01)

(52) U.S. Cl.
  CPC .......... *G06F 3/0362* (2013.01); *G06F 3/0393* (2019.05)

(58) Field of Classification Search
  CPC ..... G06F 3/0362; G06F 3/0393; B60K 35/00; B60K 35/10; B60K 35/53; B60K 35/81; B60W 50/08
  See application file for complete search history.

(56) References Cited

U.S. PATENT DOCUMENTS

2022/0137722 A1  5/2022  Hayashi et al.
2022/0317786 A1  10/2022  Eberwein et al.

FOREIGN PATENT DOCUMENTS

CN  110870204 B  * 4/2024  ............. B60K 35/10
FR  3100205 B1  11/2021

OTHER PUBLICATIONS

French Search Report corresponding to application FR 2303085, dated Oct. 9, 2023, 2 pages.

* cited by examiner

*Primary Examiner* — Sardis F Azongha
(74) *Attorney, Agent, or Firm* — Reising Ethington P.C.

(57) ABSTRACT

A human-machine interface device that includes a touch-sensitive device having a touch-sensitive surface, a rotatable control knob axially movable between a high position, an intermediate position, and a low position, the control knob being electrically connected with the touch-sensitive surface permanently via a first contact element. The control knob is electrically connected with the touch-sensitive surface via a second contact element in the high position and the intermediate position but not in the low position, and the control knob is electrically connected to the touch-sensitive surface via a third contact element in the upper position but not in the intermediate position and the low position.

10 Claims, 5 Drawing Sheets

[Fig. 1]
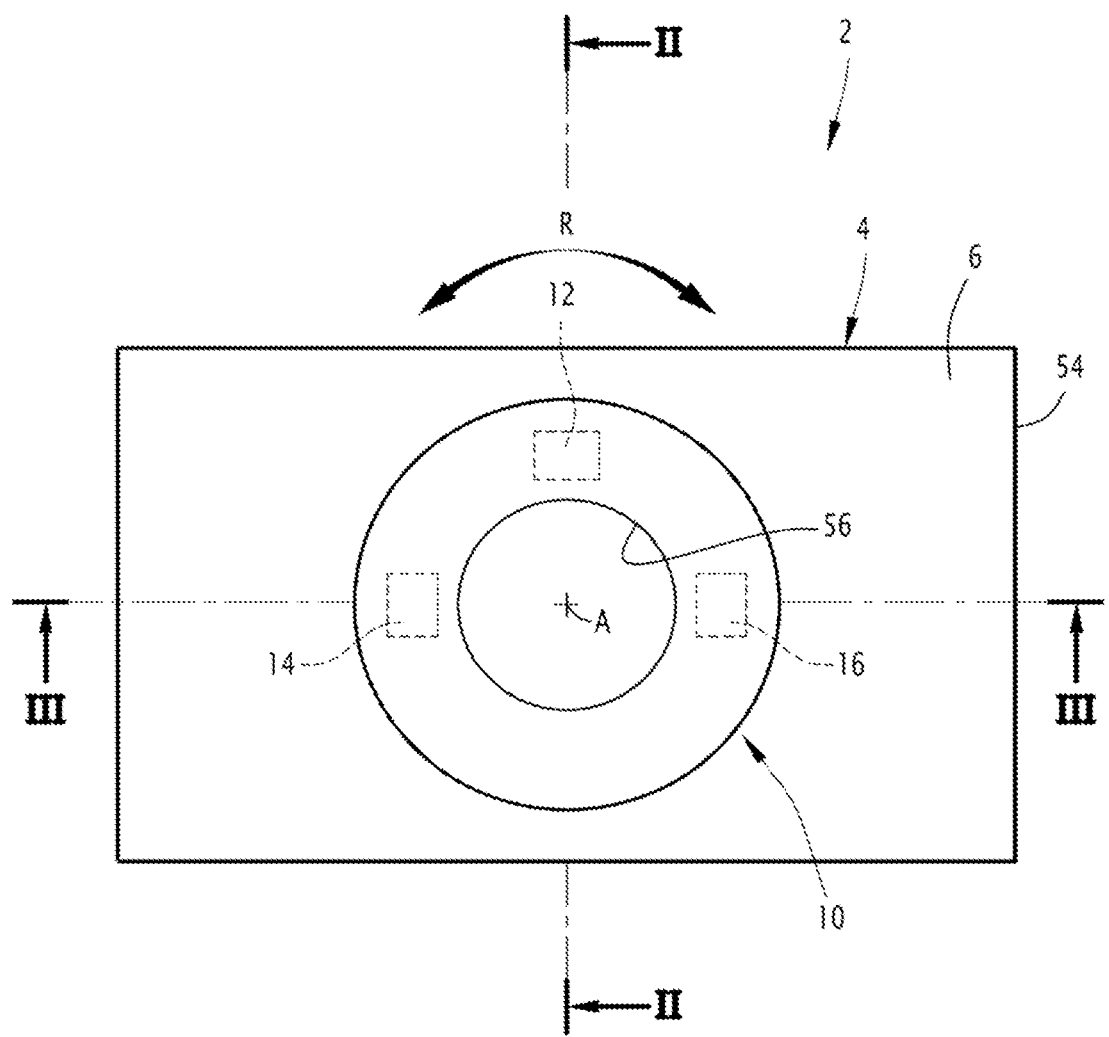

[Fig. 2]
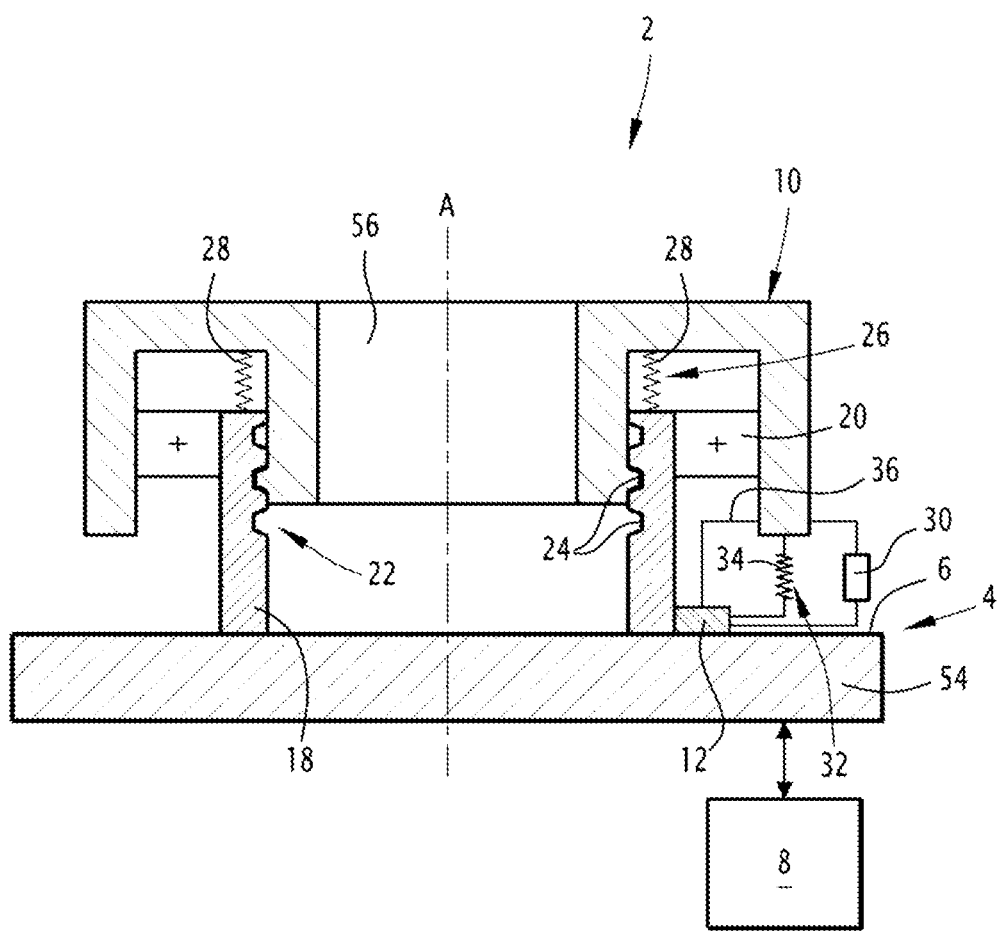

[Fig. 3]
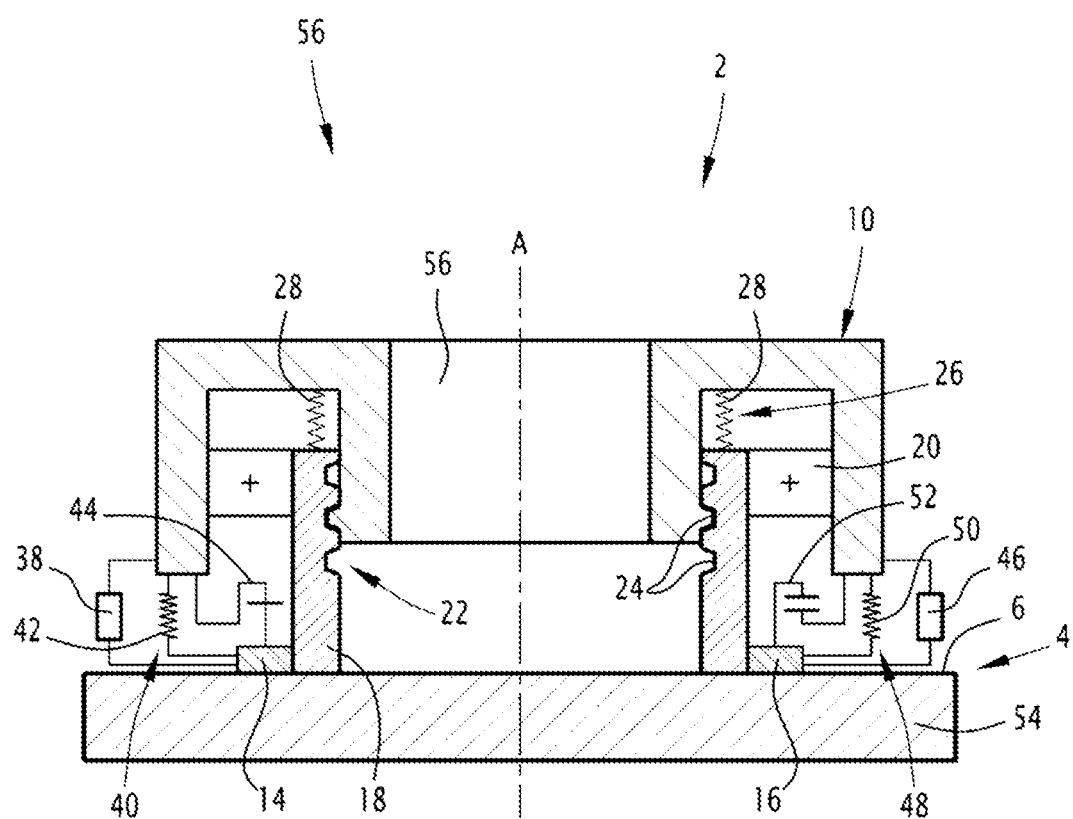

[Fig. 4]
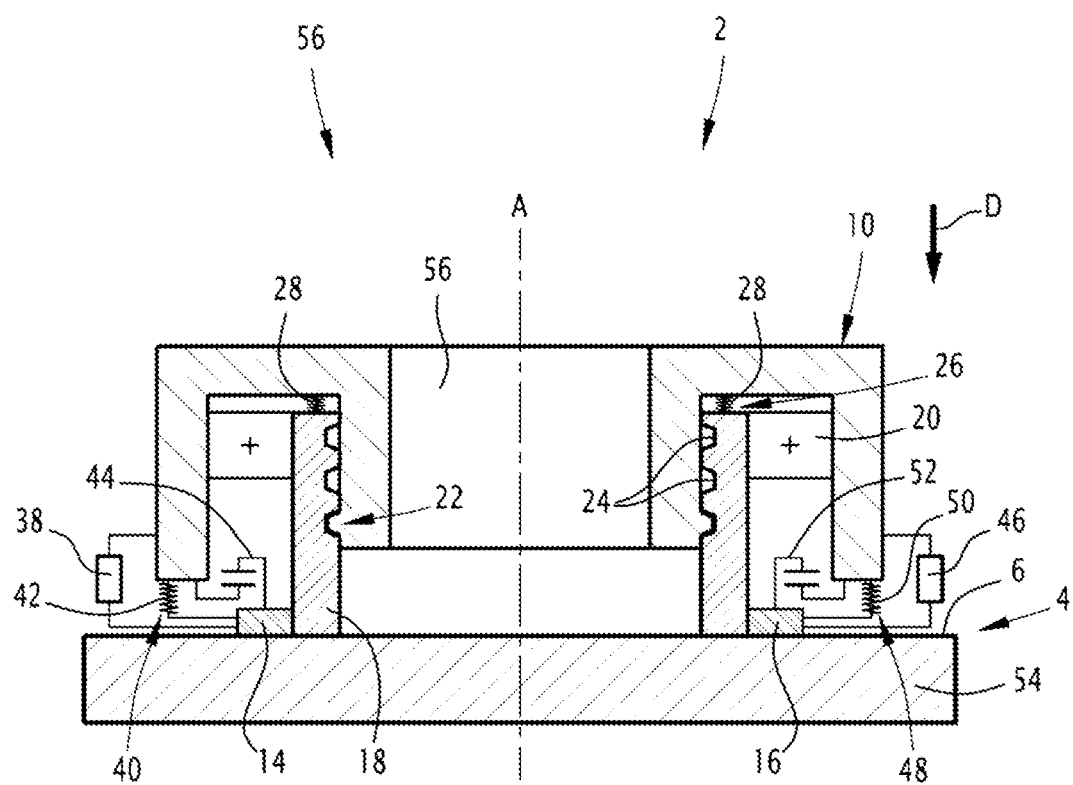

[Fig. 5]
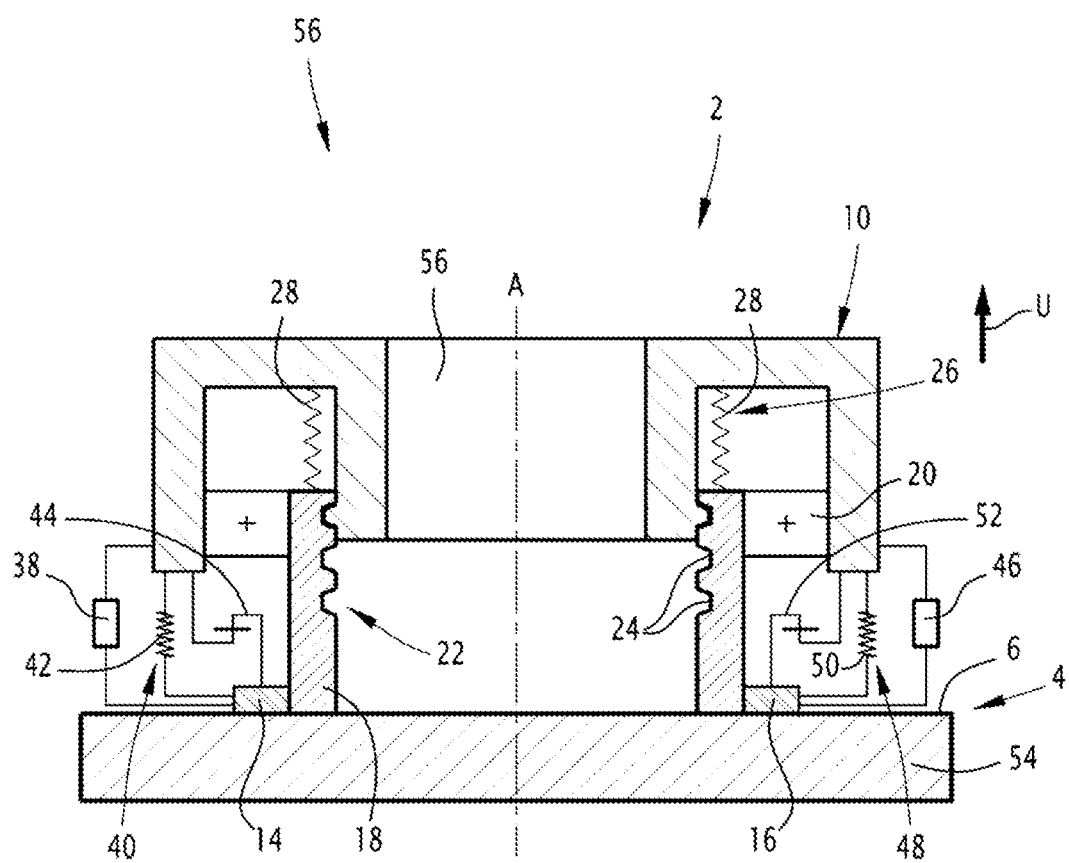

HUMAN-MACHINE INTERFACE DEVICE AND VEHICLE COMPRISING SUCH A HUMAN-MACHINE INTERFACE DEVICE

TECHNICAL FIELD

The present invention relates to the field of human-machine interface devices, in particular those used in vehicles, in particular motor vehicles.

BACKGROUND

The human-machine interface devices installed in vehicles often have an image display screen and offer more and more functionalities and knobs associated with those functionalities, whether they are physical knobs or digital knobs accessible in pages of a graphical user interface having for example a plurality of pages.

This poses problems related to the driver's attention, which is increasingly monopolized by the human-machine interface device for managing the various functionalities of the vehicle, and problems related to the cognitive load necessary to manage all these functionalities.

SUMMARY

One of the aims of the invention is to provide a human-machine interface device that is easy to use, enabling the user to use it with limited attention and cognitive load dedicated to the human-machine interface device.

To this end, the invention provides, in at least one embodiment, a human-machine interface device comprising:
- a touch-sensitive device having a touch-sensitive surface,
- a control knob movably mounted relative to the touch-sensitive surface while being rotatable about an axis of rotation and movable in translation along the axis of rotation between several axial positions including a high position, an intermediate position, and a low position,
- a first contact element linked to the control knob so as to move over the touch-sensitive surface due to the rotation of the control knob, the control knob being electrically connected with the touch-sensitive surface permanently via the first contact element,
- a second contact element arranged such that, in the high position and the intermediate position, the second contact element is in contact with the touch-sensitive surface, the control knob being electrically connected with the touch-sensitive surface via the second contact element, and, in the low position, the electrical connection between the control knob and the touch-sensitive surface via the second contact element is interrupted, and
- a third contact element arranged such that, in the high position, the third contact element is in contact with the touch-sensitive surface and the control knob is electrically connected to the touch-sensitive surface via the third contact element, and, in the intermediate position and the low position, the electrical connection between the control knob and the touch-sensitive surface via the third contact element is interrupted.

The association of an axially movable rotary knob with a touch-sensitive surface used to detect an angular position and an axial position of the rotary knob makes it possible to associate different controls or control modes with the rotary knob depending on the axial position of the rotary knob, with simple detection.

The grouping of controls on the same rotary knob makes it possible to limit the number of knobs to be handled by the user. The rotary knob can be handled easily by the user, by touch, without the need to look at the knob to know its angular position or axial position.

In particular embodiments, the human-machine interface device comprises one or more of the following optional features, taken individually or in any technically possible combination:
- in the high position and the intermediate position, the second contact element is electrically connected to the control knob, and, in the low position, said electrical connection between the second contact element and the control knob is interrupted, and/or, in the high position, the third contact element is electrically connected to the control knob, and, in the intermediate position and the low position, said electrical connection between the third contact element and the control knob is interrupted;
- the second contact element is mechanically linked to the control knob so as to move about the axis of rotation due to the rotation of the control knob and/or the third contact element is mechanically linked to the control knob so as to move about the axis of rotation due to the rotation of the control knob;
- the second contact element is permanently in contact with the touch-sensitive surface and/or the third contact element is permanently in contact with the touch-sensitive surface;
- the control knob is annular in shape;
- the touch-sensitive device comprises a touch-sensitive display screen, the touch-sensitive surface being a display surface of the touch-sensitive display screen;
- the human-machine display device comprises an electrical control module configured to detect interactions with the touch-sensitive surface, the electrical control module being configured to discriminate measurement signals generated by the first contact element, the second contact element and the third contact element depending on the signal-to-noise ratio of each of the measurement signals;
- the signal/noise ratio of a measurement signal generated by the first contact element is strictly greater than the signal/noise ratio of a measurement signal generated by the second contact element and/or the signal/noise ratio of a measurement signal generated by the first contact element is strictly greater than the signal/noise ratio of a measurement signal generated by the third contact element;
- the human-machine interface device is configured such that each axial position of the control knob corresponds to a respective control mode wherein the angular position of the control knob is associated with a particular control, the control being different from one control mode to another;
- the controls associated with the axial positions of the control knob are different controls of the same functional component and/or of the controls of different functional components.

The invention also relates to a vehicle comprising a human-machine interface device as defined above.

BRIEF DESCRIPTION OF THE DRAWINGS

The invention and its advantages will be better understood on reading the following disclosure, given solely by way of non-limiting example, and made with reference to the appended drawings, wherein FIG. 1 is a schematic top view of a human-machine interface device comprising an axially movable rotary control knob;

FIG. 2 is an axial cross-sectional schematic view of the human-machine interface device, along II-II of FIG. 1;

FIGS. 3, 4 and 5 are schematic sectional views of the human-machine interface device along III-III in FIG. 1, showing the rotary knob in different axial positions.

DETAILED DESCRIPTION

As shown in FIG. 1, the human-machine interface device 2 comprises a touch-sensitive device 4 comprising a touch-sensitive surface 6.

The touch-sensitive device 4 is configured to detect an interaction with the touch-sensitive surface 6, and preferably to detect the position of one or more points of contact with the touch-sensitive surface 6. The touch-sensitive device 4 is preferably configured to simultaneously detect the positions of several points of contact with the touch-sensitive surface 6.

The touch-sensitive device 4 for example comprises an electrical control module 8 configured to detect the contact point(s) with the touch-sensitive surface 6. The electrical control module 8 comprises, for example, resistive sensors and/or capacitive sensors for detecting the contact point(s) with the touch-sensitive surface 6.

The human-machine interface device 2 comprises a control knob 10 arranged above the touch-sensitive surface 6 while being mounted rotatable about an axis of rotation A.

The touch-sensitive surface 6 is for example substantially planar. The axis of rotation A is for example substantially perpendicular to the touch-sensitive surface 6.

Moreover, the control knob 10 is movable in translation along the axis of rotation A between several axial positions including a high position (or high axial position), an intermediate position (or intermediate axial position) and a low position (or low axial position). The intermediate position is located axially between the high position and the low position.

The control knob 10 is away from the touch-sensitive surface 6 in the high position and close to the touch-sensitive surface 6 in the low position.

The control knob 10 is intended to be manipulated by the user to interact with the human-machine interface device 2.

During manipulation of the control knob 10, the user touches the control knob 10 which is therefore electrically connected with the hand of the user.

The human-machine interface device 2 comprises several contact elements, each contact element being mechanically and electrically linked to the control knob 10 so that the contact element is in contact with the touch-sensitive surface 6 and electrically connected to the control knob 10 in at least one of the plurality of axial positions of the control knob 10.

When a contact element is in contact with the touch-sensitive surface 6 and electrically connected to the control knob 10, and the user touches the control knob 10, the touch-sensitive device 4 detects the position of said contact element on the touch-sensitive surface 6.

The human-machine interface device 2 comprises a first contact element 12 mechanically linked to the control knob 10 so as to move over the touch-sensitive surface 6 due to the rotation of the control knob 10, the control knob 10 being permanently electrically connected with the touch-sensitive surface 6 via the first contact element 12.

Preferably, the first contact element 12 is mechanically connected to the control knob 10 so as to be permanently in contact with the touch-sensitive surface 6 and is permanently electrically connected to the control knob 10.

The human-machine interface device 2 comprises a second contact element 14 arranged such that, in the high position and the intermediate position, the control knob 10 is electrically connected with the touch-sensitive surface 6 via the second contact element 14, and, in the low position, the electrical connection between the control knob 10 and the touch-sensitive surface 6 via the second contact element 14 is interrupted.

The second contact element 14 is for example arranged such that, in the high position and the intermediate position, the second contact element 14 is electrically connected to the control knob 10, and, in the low position, said electrical connection is interrupted.

The second contact element 14 is preferably arranged such that it is in contact with the touch-sensitive surface 6 at least in the high position and the intermediate position. The second contact element 14 is for example arranged such that it is in contact with the touch-sensitive surface 6 in the high position, the intermediate position and the low position. The second contact element 14 is in particular arranged such that it is permanently in contact with the touch-sensitive surface 6.

The human-machine interface device 2 comprises a third contact element 16 arranged such that, in the high position, the control knob 10 is electrically connected to the touch-sensitive surface 6 via the third contact element 16, and, in the intermediate position and the low position, the electrical connection between the control knob 10 and the touch-sensitive surface 6 via the third contact element 16 is interrupted.

The third contact element 16 is preferably arranged such that it is in contact with the touch-sensitive surface 6 at least in the high position. The third contact element 16 is for example arranged such that it is in contact with the touch-sensitive surface 6 in the high position, the intermediate position and the low position. The third contact element 16 is in particular arranged such that it is permanently in contact with the touch-sensitive surface 6.

The control knob 10 is electrically connected with the touch-sensitive surface 6 permanently via the first contact element 12, the control knob 10 is electrically connected with the touch-sensitive surface 6 via the second contact element 14 in the high position and the intermediate position but not in the low position, and the control knob 10 is electrically connected to the touch-sensitive surface 6 via the third contact element 16 in the high position but not in the intermediate position and the low position.

As shown in FIGS. 2 to 5, the human-machine interface device 2 comprises a base 18 fixedly mounted on the touch-sensitive surface 6, the control knob 10 being movably mounted on the base 18 while being movable in rotation about the axis of rotation A and movable in translation along the axis of rotation A between several axial positions including the high position (FIG. 5), the intermediate position (FIGS. 2 and 3) and the low position (FIG. 4).

The various axial positions are discrete. In a preferred embodiment, the control knob 10 has exactly three axial positions, namely the high position, the intermediate position and the low position.

The control knob 10 is for example mounted rotatably on the base 18 by means of a roller track device 20 allowing the axial movement of the control knob 10 along the axis of rotation A.

The human-machine interface device 2 preferably comprises an axial locking device 22 configured to hold the control knob 10 axially in at least one of the axial positions of the control knob 10, and in particular each of the axial positions.

The axial locking device 22 is for example configured to allow movement from one of the axial positions to another adjacent axial position by exerting an axial force exceeding a threshold force.

The axial locking device 22 for example has one or more notches 24, at least one of the axial positions being associated with a corresponding notch, and in particular each axial position being associated with a respective notch.

Optionally, the human-machine interface device 2 comprises an axial return device 26 configured to return the control knob 10 to one of the axial positions.

In one embodiment, the axial return device 26 is configured to return the control knob 10 to the intermediate position.

The axial return device 26 comprises for example at least one elastically deformable axial return member 28. Each axial return member 28 is for example a compression spring.

In one embodiment, the control knob 10 has a stable axial position, defined for example by a notch 24 of the axial locking device 22, the axial return device 26 returning the control knob 10 from each of the other positions to the stable axial position in the absence of action by the user. The stable axial position is for example the intermediate position.

In one embodiment, the control knob 10 has two stable axial positions, each defined for example by a respective notch 24 of the axial locking device 22, the axial return device 26 returning the control knob 10 from each of the other positions to the next stable axial position in the return direction in the absence of action by the user.

In a particular embodiment, the low position and the intermediate position are stable and the axial return device 26 returns the control knob 10 from the high position to the intermediate position.

In another particular embodiment, the intermediate position and the high position are stable and the axial return device 26 returns the control knob 10 from the low position to the intermediate position.

As can be seen in FIG. 2, the first contact element 12 is for example mechanically linked to the control knob 10 so as to move over the touch-sensitive surface 6 due to the rotation of the control knob 10 by being permanently in contact with the touch-sensitive surface 6, and it is permanently electrically connected to the control knob 10.

The human-machine interface device 2 comprises for example a first mechanical connection 30 between the first contact element 12 and the control knob 10, the first mechanical connection 30 allowing the translation of the control knob 10 (axially movable) relative to the first contact element 12 (in permanent contact with the touch-sensitive surface 6) while linking the first contact element 12 to the control knob 10 in rotation about the axis of rotation A.

The first mechanical connection 30 is for example a sliding connection allowing translation parallel to the axis of rotation A, as shown schematically in FIG. 2.

Preferably, the human-machine interface device 2 comprises a first return device 32 configured to hold the first contact element 12 in permanent contact with the touch-sensitive surface 6.

The first return device 32 comprises for example a first elastic return member 34. The first return member 34 is for example interposed between the control knob 10 and the first contact element 12. The first return member 34 is for example an elastic tongue integrally formed as a single piece of material with the control knob 10.

The first contact element 12 is for example permanently electrically connected to the control knob 10, that is, regardless of the axial position of the control knob 10 and regardless of the angular position of the control knob 10.

The human-machine interface device 2 comprises for example a first electrical connection 36 permanently electrically connecting the control knob 10 and the first contact element 12.

In particular, the human-machine interface device 2 comprises a first electrical connection 36 electrically connecting the control knob 10 and the first contact element 12 regardless of the axial position of the control knob 10 and regardless of the angular position of the control knob 10.

As shown in FIGS. 3-5, the second contact element 14 is for example mechanically linked to the control knob 10 such that, the second contact element 14 is in contact with the touch-sensitive surface 6 at least in the high position (FIG. 5) and the intermediate position (FIG. 3), and in particular permanently.

The human-machine interface device 2 comprises for example a second mechanical connection 38 arranged between the second contact element 14 and the control knob 10, the second mechanical connection 38 allowing the translation of the control knob 10 (axially movable) relative to the second contact element 14.

Preferably, the second mechanical connection 38 links the second contact element 14 to the control knob 10 in rotation about the axis of rotation A.

The second mechanical connection 38 is for example a sliding connection allowing translation parallel to the axis of rotation A as shown schematically in FIGS. 3 to 5.

The human-machine interface device 2 comprises for example a second return device 40 configured to hold the second contact element 14 in permanent contact with the touch-sensitive surface 6.

The second return device 40 comprises for example a second elastic return member 42. The second return member 42 is for example interposed between the control knob 10 and the second contact element 14. The second return member 42 is for example an elastic tongue integrally formed in a single piece of material with the control knob 10.

As shown in FIGS. 3-5, the second contact element 14 is for example electrically connected to the control knob 10 such that the electrical connection with the control knob 10 is effective in the high position (FIG. 5) and in the intermediate position (FIG. 3), and the electrical connection with the control knob 10 is interrupted in the low position (FIG. 4).

The human-machine interface device 2 comprises for example a second electrical connection 44 electrically connecting the control knob 10 and the second contact element 14 such that the electrical connection with the control knob 10 is effective in the high position and in the intermediate position and the electrical connection with the control knob 10 is interrupted in the low position.

The second electrical link 44 comprises, for example, a switch comprising two electrical contacts arranged so as to be in contact with one another in the high position and the intermediate position, and separated from one another in the low position.

As can be seen in FIGS. 3 to 5, the third contact element 16 is for example mechanically linked to the control knob 10 such that the third contact element 16 is in contact with the touch-sensitive surface 6 at least in the high position (FIG. 4), and in particular permanently.

The human-machine interface device 2 comprises for example a third mechanical connection 46 arranged between the third contact element 16 and the control knob 10, the third mechanical connection 46 allowing the translation of the control knob 10 relative to the third contact element 16, which is for example in permanent contact with the touch-sensitive surface 6.

Preferably, the third mechanical connection 46 links the second contact element 16 to the control knob 10 in rotation about the axis of rotation A.

The third mechanical connection 46 is for example a sliding connection allowing translation parallel to the axis of rotation A as shown schematically in FIGS. 3 to 5.

The human-machine interface device 2 comprises for example a third return device 48 configured to hold the third contact element 16 in permanent contact with the touch-sensitive surface 6.

The third return device 48 comprises for example a third elastic return member 50. The third return member 50 is for example interposed between the control knob 10 and the third contact element 16. The third return member 50 is for example an elastic tongue integrally formed in a single piece of material with the control knob 10.

As shown in FIGS. 3 to 5, in one embodiment, the third contact element 16 is electrically connected to the control knob 10 such that the electrical connection between the third contact element 16 and the control knob 10 is effective in the high position, and the electrical connection between the third contact element 16 and the control knob 10 is interrupted in the intermediate position and in the low position.

The human-machine interface device 2 comprises for example a third electrical connection 52 electrically connecting the control knob 10 and the third contact element 16 such that the electrical connection between the third contact element 16 and the control knob 10 is effective in the high position, and the electrical connection between the third contact element 16 and the control knob 10 is interrupted in the intermediate position and in the low position.

The third electrical connection 52 comprises for example a switch comprising two electrical contacts arranged so as to be in contact with one another in the high position, and separated from one another in the intermediate position and in the low position.

The operation of the human-machine interface device 2 will now be described with reference to FIGS. 1 to 5, assuming that the control knob 10 is manipulated by the user and that the user therefore touches the control knob 10.

When the user touches the control knob 10, in each axial position of the control knob 10, the touch-sensitive device 4, and in particular the electrical control module 8, is able to detect the position of each of the first contact element 12, the second contact element 14 and the third contact element 16 which is in contact with the touch-sensitive surface 6 and electrically connected to the control knob 10.

The first contact element 12 is for example in permanent contact with the touch-sensitive surface 6 and permanently electrically connected with the control knob 10.

During the rotation of the control knob 10 about the axis of rotation A, the first contact element 12 describes an arc of circle on the touch-sensitive surface 6 centered on the axis of rotation A The human-machine interface device 2, and in particular the electrical control module 8, is configured to determine the angular position of the control knob 10 as a function of the position of the first contact element 12 on the touch-sensitive surface 6.

The human-machine interface device 2 is for example configured such that each axial position of the control knob 10 corresponds to a respective control mode wherein the angular position of the control knob 10 is associated with a particular control, the control being different from one control mode to another.

The human-machine interface device 2, and in particular the electrical control module 8, is for example configured to determine the operating mode depending on whether or not the second contact element 14 is detected on the touch-sensitive surface 6 and whether or not the third contact element 16 is detected on the touch-sensitive surface 6.

As shown in FIG. 3, the control knob 10 is in the intermediate position.

The second contact element 14 is electrically connected to the control knob 10, for example via the first electrical connection 44, and the electrical connection between the third contact element 16 and the control knob 10 is interrupted.

The electrical control module 8 therefore detects the contact of the second contact element 14 on the touch-sensitive surface 6, but does not detect the contact of the third contact element 16 on the touch-sensitive surface 6, and is configured to determine that consequently the control knob 10 is in the intermediate position.

The electrical control module 8 associates, with the angular position of the control knob 10, a control corresponding to the intermediate position of the control knob 10.

As shown in FIG. 4, the control knob 10 is lowered to the low position (as shown by arrow D).

The electrical connection between the second contact element 14 and the control knob 10 is interrupted, and the electrical connection between the third contact element 16 and the control knob 10 is interrupted.

The electrical control module 8 does not detect the contact of the second contact element 14 on the touch-sensitive surface 6 or the contact of the third contact element 16 on the touch-sensitive surface 6, and is configured to determine that consequently the control knob 10 is in the low position.

The electrical control module 8 associates, with the angular position of the control knob 10, a control corresponding to the low position of the control knob 10.

As shown in FIG. 5, the control knob 10 is raised in the high position (as shown by the arrow U). The electrical connection between the second contact element 14 and the control knob 10 is effective, and the electrical connection between the third contact element 16 and the control knob 10 is effective.

The second contact element 14 is electrically connected to the control knob 10, for example via the first electrical connection 44, and the third contact element 16 is electrically connected to the control knob 10, for example via the third electrical connection 52.

The electrical control module 8 detects the contact of the second contact element 14 on the touch-sensitive surface 6 and detects the contact of the third contact element 16 on the touch-sensitive surface 6, and is configured to determine that consequently the control knob 10 is in the high position.

The electrical control module 8 associates, with the angular position of the control knob 10, a control corresponding to the high position of the control knob 10.

It is desirable for the electrical control module 8 to be able to differentiate the contact signals generated by the first contact element 12, the second contact element 14 and the third contact element 16, in particular to discriminate the contact corresponding to the first contact element 12, whose position on the touch-sensitive surface 6 makes it possible to determine the angular position of the control knob 10, of the contacts corresponding to the second contact element 14 and the third contact element 16.

Each of the first contact element 12, the second contact element 14 and the third contact element 16 causes the generation of a measurement signal by the touch-sensitive device 4 when it is in contact with the touch-sensitive surface 6 and electrically connected to the control knob 10 touched by a user, the measurement signal having a signal/noise ratio.

In one embodiment, the first contact element 12, the second contact element 14 and the third contact element 16 are configured to cause the generation of measurement signals having different signal/noise ratios.

This can be achieved by providing contact elements 12 with different shapes, in particular with different contact areas.

Correspondingly, the electrical control module 8 is configured to discriminate the measurement signals from the touch-sensitive device 4 generated by the contact elements as a function of the signal/noise ratios of the measurement signals.

In one embodiment, the first contact element 12, the second contact element 14 and the third contact element 16 are configured such that the signal/noise ratio of the measurement signal generated by the contact of the first contact element 12 on the touch-sensitive surface 6 is strictly greater than that of the measurement signals generated by each of the second contact element 14 and the third contact element 16.

A higher signal/noise ratio for the first contact element 12 makes it possible to distinguish the first contact element 12 from the second contact element 14 and from the third contact element 16 while having a good signal/noise ratio for the measurement signal corresponding to the first contact element 12, which makes it possible to more precisely detect the position of the first contact element 12, and therefore the angular position of the control knob 10.

A lower signal/noise ratio for the second contact element 14 and the third contact element 16 is sufficient to detect or not the second contact element 14 and the third contact element 16, knowing that it is not necessary to precisely determine the position of the second contact element 14 and the third contact element 16 on the touch-sensitive surface 6.

The discrimination of the second contact element 14 and the third contact element 16 is less critical insofar as the axial position of the control knob 10 is determined according to the number of contacts detected for the second contact element 14 and the third contact element 16: one contact corresponds to the intermediate position, no contact corresponds to the low position and two contacts corresponds to the high position.

The controls associated with the axial positions of the control knob 10 can be different controls of the same functional component and/or controls of different functional components.

In one embodiment, the three axial positions of the control knob 10 correspond to three different controls of the same functional component.

In a particular embodiment, the three axial positions of the control knob 10 correspond to three different controls of a heating, ventilation and air conditioning system, for example a temperature control, an airflow rate control and a control to select a mode of distribution of the flow of air among various air vents.

In a particular embodiment, the three axial positions of the control knob 10 correspond to three different controls of an infotainment system, for example a sound level control, a source selection control and a navigation control in the selected source menu.

In one embodiment, the three axial positions of the control knob 10 correspond to three controls of three different functional components.

In a particular embodiment, the three axial positions of the control knob 10 correspond to a navigation control in a settings menu of a vehicle (engine, suspension, drive mode, etc.), a navigation control in the control menu of a heating, ventilation and air conditioning system, and a navigation control in an infotainment system control menu.

Optionally, the human-machine interface device 2 comprises a digital touch screen 54 configured to display digital images, the touch-sensitive surface 6 being the image display surface of the touch screen 54.

The touch screen 54 comprises, in a known manner, a matrix of pixels. The touch screen 54 is for example chosen from a liquid crystal screen, a light-emitting diode (LED) screen, in particular a screen with organic light-emitting diodes (or OLED), or a plasma screen.

Optionally, the control knob 10 is annular in shape and has a central opening 56, an area of the touch screen 54 being visible through the central opening 56.

This makes it possible for example to display information associated with a control generated using the control knob 10, in the area of the touch screen 54 visible through the central opening 56.

By virtue of the above-described embodiment of the invention, it is possible to have a human-machine interface device 2 having a control knob 10 having different control modes, each associated with a respective axial position of the control knob 10.

Such a human-machine interface device 2 can be used easily by the user by touch, without monopolizing the user's attention or causing cognitive overload. The user remains better concentrated on his main task, for example driving a vehicle.

The detection of the axial position of the control knob 10 and of the angular position of the control knob 10 can be carried out reliably and is simple to implement via the touch-sensitive surface 6.

In particular, the use of two contact elements for the detection of the axial position and of one contact element for the angular position makes it possible to perform a reliable detection of the axial position according to the detected number of contacts and to perform precise detection of the angular position as a function of a contact dedicated to the detection of this angular position.

The invention claimed is:

1. A human-machine interface device comprising:
   a touch-sensitive device having a touch-sensitive surface,
   a control knob movably mounted relative to the touch-sensitive surface while being rotatable about an axis of rotation and movable in translation along the axis of rotation between several axial positions including a high position, an intermediate position, and a low position,
   a first contact element linked to the control knob so as to move over the touch-sensitive surface due to the rotation of the control knob, the control knob being electrically connected with the touch-sensitive surface permanently via the first contact element, a second contact element arranged such that, in the high position and the intermediate position, the second contact element is in contact with the touch-sensitive surface, the control knob being electrically connected with the touch-sensitive surface via the second contact element, and, in the low position, the electrical connection between the control knob and the touch-sensitive surface via the second contact element is interrupted, a third contact element arranged such that, in the high position, the third contact element is in contact with the touch-sensitive surface and the control knob is electrically connected to the touch-sensitive surface via the third contact element, and, in the intermediate position and the low position, the electrical connection between the control knob and the touch-sensitive surface via the third contact element is interrupted, and an electrical control module configured to detect interactions with the touch-sensitive surface, the electrical control module being configured to discriminate measurement signals generated by the first contact element, the second contact element and the third contact element depending on the signal/noise ratio of each of the measurement signals.

2. The human-machine interface device according to claim 1, wherein: in the high position and the intermediate position, the second contact element is electrically connected to the control knob, and, in the low position, said electrical connection between the second contact element and the control knob is interrupted, and/or in the high position, the third contact element is electrically connected to the control knob, and, in the intermediate position and the low position, said electrical connection between the third contact element and the control knob is interrupted.

3. The human-machine interface device according to claim 1, wherein the second contact element is mechanically linked to the control knob so as to move about the axis of rotation due to the rotation of the control knob and/or the third contact element is mechanically linked to the control knob so as to move about the axis of rotation due to the rotation of the control knob.

4. The human-machine interface device according to claim 1, wherein the second contact element is permanently in contact with the touch-sensitive surface and/or the third contact element is permanently in contact with the touch-sensitive surface.

5. The human-machine interface device according to claim 1, wherein the control knob is annular in shape.

6. The human-machine interface device according to claim 1, wherein the touch-sensitive device comprises a touch-sensitive display screen, the touch-sensitive surface being a display surface of the touch-sensitive display screen.

7. The human-machine interface device according to claim 1, wherein the signal/noise ratio of a measurement signal generated by the first contact element is strictly greater than the signal/noise ratio of a measurement signal generated by the second contact element and/or the signal/noise ratio of a measurement signal generated by the first contact element is strictly greater than the signal/noise ratio of a measurement signal generated by the third contact element.

8. The human-machine interface device according to claim 1, configured such that each axial position of the control knob corresponds to a respective control mode wherein the angular position of the control knob is associated with a particular control, the control being different from one control mode to another.

9. The human-machine interface device according to claim 1, wherein the controls associated with the axial positions of the control knob are different controls of the same functional component and/or of the controls of different functional components.

10. A motor vehicle comprising the human-machine interface device according to claim 1.

* * * * *